United States Patent
Cudzilo (10) Patent No.: US 10,015,631 B2
(45) Date of Patent: Jul. 3, 2018

(54) METHOD FOR PROVIDING A MOBILE LOCATION BASED INFORMATION SERVICE

(71) Applicant: Martin Cudzilo, Frankfurt a. M. (DE)

(72) Inventor: Martin Cudzilo, Frankfurt a. M. (DE)

( * ) Notice: Subject to any disclaimer, the term of this patent is extended or adjusted under 35 U.S.C. 154(b) by 0 days.

(21) Appl. No.: 15/321,250

(22) PCT Filed: Jun. 24, 2015

(86) PCT No.: PCT/EP2015/064219
§ 371 (c)(1),
(2) Date: Dec. 22, 2016

(87) PCT Pub. No.: WO2015/197673
PCT Pub. Date: Dec. 30, 2015

(65) Prior Publication Data
US 2017/0164150 A1    Jun. 8, 2017

(30) Foreign Application Priority Data
Jun. 24, 2014   (EP) .................... 14173787

(51) Int. Cl.
| H04W 4/02 | (2018.01) |
| G01S 5/02 | (2010.01) |
| H04W 4/04 | (2009.01) |
| G06Q 10/02 | (2012.01) |
| H04W 64/00 | (2009.01) |

(52) U.S. Cl.
CPC .......... *H04W 4/023* (2013.01); *G01S 5/0294* (2013.01); *G06Q 10/02* (2013.01); *H04W 4/025* (2013.01); *H04W 4/04* (2013.01); *H04W 64/00* (2013.01)

(58) Field of Classification Search
CPC .............. G06Q 50/01; G06Q 30/0255; G06Q 30/0261; G06Q 10/10; G06Q 30/0267; G06Q 30/0269; G06Q 10/00; G06Q 30/0251; G06Q 10/0833; G06Q 10/1095; H04L 51/32; H04L 67/306; H04L 51/10; H04L 51/16
See application file for complete search history.

(56) References Cited

U.S. PATENT DOCUMENTS

| 2003/0212996 A1 | 11/2003 | Wolzien | |
| 2014/0067488 A1* | 3/2014 | James | G06Q 30/02 705/13 |

FOREIGN PATENT DOCUMENTS

| EP | 2597423 | 5/2013 |
| WO | 2009151925 | 12/2009 |

OTHER PUBLICATIONS

International Search Report for PCT/EP2015/064219, Completed by the European Patent Office on Jul. 28, 2015, 3 Pages.

* cited by examiner

*Primary Examiner* — Kwasi Karikari
(74) *Attorney, Agent, or Firm* — Brooks Kushman P.C.

(57) ABSTRACT

A location-based service, and in particular location-based services involving mobile devices. With the disclosed method it is possible to provide individual information at a certain location to individual users, wherein the information may be based on a location profile that may be updated depending on inputs of the user itself or other users.

19 Claims, 1 Drawing Sheet

METHOD FOR PROVIDING A MOBILE LOCATION BASED INFORMATION SERVICE

CROSS-REFERENCE TO RELATED APPLICATION

This application is the U.S. national phase of PCT Application No. PCT/EP2015/064219 filed on Jun. 24, 2015, which claims priority to EP Patent Application No. 14173787.4 filed on Jun. 24, 2014, the disclosures of which are incorporated in their entirety by reference herein.

This invention relates to the field of location-based services, and in particular to the field of location-based services involving mobile devices.

Location systems have been developed for determining and tracking the locations of the users of mobile devices such as cellular phones. The determination of location of such a mobile device may be based on the global positioning systems (GPS), and as well as on various triangulation systems that use mobile devices signals, broadcast television signals, or the like.

In the alternative, dead reckoning systems also exist for determining locations of mobile devices based on movement in reference to a set of known coordinates.

A variety of methods and systems have been developed that include an adaptable user interface, which may transmit a current location of a mobile device to another device or system, in particular a server, wherein the other device or system may receive an electronic storage file or other indication as location data of the current location of the mobile device.

Nevertheless, various location based services are known in the state of the art, the location based services known have the disadvantage that no dynamical presentation of data depending on a certain location, a certain time and date and a specific user may be provided, wherein the information to be provided to the mobile device is adapted in reaction to inputs of the user or other users, and wherein different information may be provided to different users depending, in particular depending on said inputs of different users.

In contrast to, the method of the present disclosure may provide the possibility to provide information via location based services dynamically.

One example of the present disclosure is a method, in particular a computer implemented method, for providing a mobile location based information service comprising the following steps, in particular in the following sequence providing at least one user profile and at least one location profile, the location profile containing information relating to at least one geographic location;

a) providing at least one server operably connectable to at least one mobile device and at least one further device;
b) at the server, providing at least one user profile the user profile comprises at least a total amount of time of the a user available at a certain date and time and at least one location profile, the location profile containing information relating to at least one geographic location comprising tasks associated with a certain location and a point in time to carry out at least one of the tasks;
c) providing at least one mobile device comprising a location determining unit for determining a current location of the mobile device;
d) at the least one mobile device, sending current location data and/or first identification data of the at least one mobile device to the server;
e) at the server, based on the location data and/or the first identification data and the date and time and a location profile associated with the location data and/or a location profile associated with a further location generating at least first instructing data;
f) at the server, sending first instructing data to the at least one mobile device and causing the at least one mobile device to display at least one representation, to provide an audio output and/or a haptic output related to said first instructing data;
g) at the at least one mobile device, detecting an input representative for an acceptance, in particular a partly acceptance, or a denial answer in response to the displayed representation, the provided audio output and/or the provided haptic output, of said first instructing data and sending the acceptance, in particular the partly acceptance, or the denial answer and the first identification data to the first server;
h) at the server, in response to the acceptance, in particular the partly acceptance or the denial answer updating the location profile, and preferably based on the location data, the first identification data, the date and time and the updated location profile associate with the location data generating at least second instructing data and sending said at least second instructing data to the at least one mobile device.

The word "exemplary" is used herein to mean "serving as an example, instance, or illustration." Any implementation described herein as "exemplary" is not necessarily to be construed as preferred or advantageous over other implementations.

The mobile device may take various forms, such as, without limitation, a mobile phone, a GPS enabled mobile phone, a CDMA enabled mobile phone, a GPRS enabled mobile phone, a mobile phone with a camera, a mobile phone with browser capabilities, a GPS unit, a tracking unit, a portable electronic device with a compass, a laptop computer, a personal digital assistant, a MP3 player, a camera, a handheld device, a pager, a tablet, and/or a portable gaming device. The mobile device may of course be wearable as well like data goggles or a smart watch.

The data between the mobile device and the further device(s) or system(s) may be transmitted in a format such as an XML document, a script, an HTML document, a program, a database, a table, a message, a folder, an application, an animation and/or a text file.

The further location may in particular not be identical with the location provided to the server by the location data, but a different location.

The term server is used to refer to any computing device capable of functioning as a server, such as a master exchange server, web server, mail server, document server, or any other type of server.

A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server implemented on a computing device, such as a smart phone, thereby enabling it to function as an Internet server (e.g., an enterprise e-mail server) only to the extent necessary to provide the functionality described herein. According to one preferred example of the present disclosure, the first server may comprise of a multitude of servers that may communicate with each other.

The location profile may comprise tasks associated with a certain location, in particular a building, a ship, a train, a car, an area around a building and/or the like, a point in time to carry out at least one of the tasks, the time needed to complete a task and/or at least one floorplan of at least one building, in particular comprising the location of objects, in particular furniture, within the building, in particular a three dimensional and/or two-dimensional floorplan.

As well, the location profile may contain specific menus and graphical representations for a specific location and/or specific allocations within a specific location.

The location profile may be updatable, wherein the user may manually update the location profile with information or wherein the location profile may be automatically updated with information. The update may occur when a user stops at a location.

The user profile may comprise at least a total amount of time of the a user available at a certain date and time, in particular at a certain location, technical skills of a user, a score of the user and/or physical extends of the user and/or the location of a mobile device.

The instructing data may comprises at least one task, advise, instruction and/or information and preferably a due date and time, an expected time for completion and/or a start date and time, in particular in form of a text, a graphical representation, a video and/or an audio representation.

The instructing data may be defined in relation to an object and/or a location. The instructing data may be a geocentric list. The instructing data may be specific to a user and may without limitation alter the look and feel of the mobile device, alter the functionality of the mobile device, be in an XML format, be in a database format, and/or be in a text file format. An alert, which may relate to an item on a list, may be triggered in response to the instructing data.

The first identification data may be a user name and optionally a password, and/or an identification number of the mobile device itself. It is obvious for those skilled in the art that the first identification data may not be limited to a user name, password and/or identification number but may be any information available to identify a certain user and/or a certain mobile device. Based on the identification data, a certain mobile device and/or a certain user may be identified The representation related to the instructing data may involve audio, video, a picture related to a location, fax, email, instant message, text message, SMS, internet protocol, voice, voicemail, vibration, stimulation at least one of the five senses or an alert. The alert may involve fax, email, instant message, text message, SMS, internet protocol, voice, voicemail, vibration or stimulation of at least one of the five senses.

An acceptance answer may comprise the information that an information has been recognized and/or that a task has been completed. A partly acceptance answer may be representative for partly completing a task, while a denial answer may be representative either for a not recognizing of an information or a denial of performance of task.

A location tracking may be provided by the present disclosure, wherein a location of a portable electronic facility may be transmitted, stored in a file, stored with other information in the mobile device, and reported along with an indication of the movement of the mobile device. The information itself may be displayed on a map and may comprise an indication of speed and/or direction, and the time being at a certain location.

The instructing data may relate to the accuracy of the location information. The instructing data, the location profile and/or the user profile may refresh continuously, in accordance with set preferences or in response to a request. The frequency of the requests, in particular the sending of location data and the user identification to the server, may be varied in response to speed, location, specified preferences, proximity to a point of interest, or changes in a geofence.

The present disclosure may comprises methods of increasing the quality of location based information for a mobile device involving obtaining multiple data points for a given item of information or a location. This may comprise the use of GPS, GPRS triangulation, WIFI triangulation, Bluetooth, indoor location as disclosed e.g. in EP2597423 A1, which is herewith incorporated by reference, and other methods and devices.

The server my analyze information related to at least one mobile device involving transmitting information from the at least one mobile device and analyzing such information using an analysis engine. The information from one or more mobile devices may be stored or aggregated. The analysis engine may provide the ability to view location history or analyze location history as well as instructing data history. The analysis engine may also request additional information or send alerts to a user of the mobile device or to further users. The analysis engine may perform analytics on location information such as predictive analysis and descriptive analysis.

The information provided by the analysis engine may include date and time of acceptance, partly acceptance or denial answers in response to received instructing data from a user, evaluation data of further users, and other parameters. The analysis engine may tailor information to the behavior of a user, such as observing the behavior of a user and communicating information to the user by the mobile device, such as information based on the observed behavior of a user, in particular a score value.

The surprising finding of the present disclosure is that with the disclosed method it is possible to provide individual information at a certain location to individual users, wherein said information may be based on a location profile that may be updated depending on inputs of the user itself or other users.

Therefore, in a first step, the user profile and at least one location profile associated with a certain location may be provided. A mobile device being at a certain location may therefore send its location data and/or first identification data to a first server. With the help of the location data, the server is enabled to identify the location profile associated with said certain location. Based on the identification of the mobile device and/or the user, it may be possible to appoint to a certain mobile device and/or a certain user individual information. As well, the information presented to the user is depending on a certain date and time.

For example, it may be possible to inform a user at a certain location to complete a specific task, wherein another user at the same location at the same time may be informed about another task or may be provided with other information. As well, it may be possible to determine that no specific task has to be performed by the user at a certain date and time a certain location based on the location profile and the user identification and/or the certain mobile device, wherein the user may be informed to move to another location, wherein the server determines based on the location profile and the date and time that a task will have to be performed at said location by the specific user.

It may therefore be possible as one example of the present disclosure to present a cleaning worker being at a building or another location the respective cleaning tasks he is in charge of depending on location he or she stays and current the date and time dynamically. As well, further information may be provided in combination with said task, like cleaning instructions how to clean a specific object.

After receiving said information, the user may decide to accept, partly accept or denial an information and/or a task, while the location profile may be updated automatically depending on said reply.

For example, if the cleaning worker accepts a task, the location profile is updated in a way that said task may not shown to the cleaning worker anymore, nor in particular to other cleaning workers being at the same location, until e.g. a repeat cycle is due, in particular at another date and time.

In the alternative, the cleaning worker may partly accept the task. This may for example be the case that it is not possible to clean a surface completely, but only partly. In this case it may be preferred that such a partly acceptance of a tasks results for example in a request if the task can for sure not be completed.

It may as well be possible that not a specific user itself is assigned with a task, but the respective task is connected to a certain mobile device, and a user using that mobile devices may or may not identify himself while using the mobile device.

With the method of the present disclosure it is therefore possible to dynamically allocate information and tasks to different users at certain locations, depending on certain points in time and, in case, further user being at the same location.

As well, it may be possible to inform users about a next location to move to. For example, if it may be identified that a task is due at a certain first location according to the respective location profile and a certain date and time, and the user of a mobile device may be at a different location, it may be possible to display on at least the first mobile device to said user the next address of service, and, in case, a map how to move to said address and/or at which point of time the user shall be present at said address. Moreover, it may be possible to provide further information, in particular on the display on the mobile device, a haptic output and/or an audio output, like how to get access to a location, e.g. how to deactivate an alarm system and/or to provide an access code, e.g via near field communication or a dynamical radio frequency tag.

According to a further example of the present disclosure, the following steps may be comprised, in particular after step g)
  i) at the server, waiting for the acceptance, in particular the partly acceptance or the denial answer from the mobile device for a defined period of time, and in case of not receiving said answer sending a first reminder data to the mobile device and causing the at least one mobile device to display at least one representation, to provide an audio output and/or a haptic output of said first reminder data;
  j) at the server, waiting for said answer for a further defined period of time, and in case of not receiving said answer after said further defined period of time sending a second reminder data to the mobile device and causing the at least one mobile device t to display at least one representation, to provide an audio output and/or a haptic output of said second reminder data; and/or
  k) at the server, waiting for said answer for a further defined period of time, and in case of not receiving said answer after said further defined period of time updating the location profile an/or the user based on a denial answer, and in particular based on the updated location profile, at the sending second instructing data to a at least a second mobile device and/or to a further electronic device.

According to a further example of the present disclosure, at least two devices sending first and second location data and first and at least second identification data for identifying the first and the at least the second mobile device to the first server, at the server, based on the first and second location data, the date and time and the location profile associate with the location data generating first and at least second instructing data and sending first instructing data to the first mobile device and causing the first device to display at least one representation related to said first instructing data and sending at least the second instructing data to the at least one second mobile device and causing the at least one second mobile device to display at least one representation related to said at least one second instructing data, and in response to the acceptance, partly acceptance or denial answer from the first and the at least one second mobile device updating the location profile.

According to this example, in case of the server receiving a denial answer, the server is sending a request to the at least one mobile device and causing the at least one mobile device to display said request, wherein said request comprises information data. Then, at the at least one mobile device, an input representative for a further acceptance, partly acceptance or denial answer in response to the displayed representation of said information data is detected and the further acceptance, partly acceptance or denial answer and the first identification data is sent to the first server. The first server updates the location profile in dependence of said answer, wherein in particular sending at least second instructing data comprising the first instructing data and, preferably, first identification data to at least a second mobile device or another device.

Furthermore, it may be possible to ensure that the user has considered the information or task presented to him by the server on the mobile device. If a partly acceptance or denial answer is detected, it may be possible to re-allocate a certain information or a certain task to a different user or to update the location profile that the respective information or task is not considered and/or completed by the user. It may as well be possible to inform the user about said re-allocation of instructing data to another user before sending further instructing data to said further user.

As well, it may be preferred that the method may further comprise the following steps, in particular after or parallel to step e)
  l) determining the total amount of time for completion of the tasks associated the location profile on a certain date and time
  m) requesting the available total time on a certain date and time from the at least one user profile from the at least one mobile device and in particular further mobile devices at different and/or the same location as the first mobile device; and
  n) generating the first instructing data and in case further instructing data based on the said total amount of time for completion of the task and said available total time of the user profile(s).

According to this example, it may be possible to assign the instructing data based on the at least one location profile to at least one mobile device. For example, the location profile comprises a building having several cleaning tasks, each of said cleaning tasks is associated with a certain time needed for completion. As a result, a total time for completion of all of the task due at a certain location at a certain point of time is determinable. As well, the total available time of at least one user of at least one mobile device is known well by the server. If the total time for completion of all tasks exceeds the total available time of the at least one user, the server may send instructing data to a further mobile device of a user being at the same or a different location.

In particular referring to huge buildings, a team of cleaning workers are present to perform the cleaning task. If e.g. 5 cleaning workers are planned to complete the tasks, and one of the cleaning workers may not be available, the tasks originally assigned to the missing cleaning worker may automatically be re-assigned to the present cleaning workers. If the total available time of the present cleaning workers is lower than the total time for all of the tasks, a further cleaning worker may be informed by sending further instructing data at the server to a further mobile device of said cleaning worker.

According to another example of the present disclosure, the method may comprise the following steps, in particular parallel to step e)
  o) at the server, generating the first instructing data based on the location of the at least one mobile device within a building, in particular based on a certain room of said building, and in particular
  p) sending further instructing data to the at least one mobile device and causing the at least one mobile device to display at least one representation related to said first instructing data, wherein the further instructing data comprises the a location information for the user to move next.

It may be preferred according to one example of the present disclosure that the location profile directed to single rooms, an area and/or single objects within a building, if appropriate. For example, if a cleaning worker enters a certain room within a building, it may be possible to inform the cleaning worker about the cleaning tasks According to a further example of the present disclosure, the method further comprises the steps, in particular parallel to step f)
  q) at the at least one mobile device, displaying the first instructing data with a representation of a current view of the user of the at least one mobile device as augmented reality, and in particular
  r) displaying the first instructing data, in particular party, next to, on the top of and/or at the objects.

Thereby it may be possible to present information directly on certain objects by the help of a display of mobile device. In the field of augmented reality a current live view of a user of a mobile device as received via a camera is presented on a display of the device augmented by computer generated text or images. Augmented reality is particularly beneficial in the provision of navigation guidance due to the convergence of a live view of a user overlaid directly with relevant navigation guidance. Thus, a user is able to relate the guidance directly to what can be seen and the potential for ambiguity in the guidance is greatly reduced. The use of augmented reality for navigation guidance is particularly useful for assigning tasks to users within a building. E.g. it may be possible to assign a cleaning task to a cleaning worker directly above the object to be cleaned while the display of the mobile device is moved around. Besides the cleaning task itself it may be possible to present additional information like cleaning instructions or the like.

According to a further example of the present disclosure the method may comprise the following steps, in particular after or parallel to step e)
  s) at the server, based on the location data, the first identification data, at least the information data of at least a further mobile device, the date and time and the location profile associate with the location data generating first instructing data and at least second instructing data; and
  t) sending first instructing data to the first mobile device and second instructing data to the at least one further mobile device and causing the first mobile device to display at least one representation related to said first instructing data and causing the at least on further mobile device to display at least one representation related to said second instructing data.

Therewith it may be possible to assign instructing data to several different users at the same time.

According to another example of the method of the present disclosure, the acceptance, partly acceptance or denial answers are received by the server, sending further instructing data to the at least one mobile device comprising a new location the user shall move to.

It may therefore be possible to instruct a user to move to another location once all information and/or all tasks available at a first location are completed.

According to a further example, the method according to the disclosure may further comprise the step that at a least one further mobile device, detecting an in input representative for the quality of completion of a task of at least the first user and sending data representative for said input to the first server, wherein at the first server an analysis engine updates the score of the user profile of at least the first user.

Thereby it may be preferred informing the user in case of the score exceeds or falls below a predefined value.

Moreover, it may be preferred as well that the analysis engine determining an overall score of all users receiving instructing data at a certain location profile and informing the said users if the overall score exceeds or falls below a predefined value, in particular informing each user about each single score of each of said users.

Finally, it may be preferred that the analysis engine determines the score using acceptance, partly acceptance or denial answers of a user as a further parameter.

According to one example, said score may be present to a user or to another person.

Thereby it may be preferred that the analysis engine may provide regular reports, like daily, weekly, monthly and/or yearly reports at the first server, the at least one mobile device or other devices, wherein said reports in particular may vary depending on the respective identification data and/or the respective device.

As well, the method may comprise according to one example that a further user may update the location profile with updating data via a further mobile device, wherein said updating data may comprise a task, an information, a certain location, a due date and time, a time stamp and a further identification data of the further user and/or the further mobile device, in particular form of a text, a photo and/or a video.

This may allow a user to add further tasks or information to the location profile. Such an additional information or task may comprise a general task, a request for service, a general information, a damage report, hygiene report, a priority and/or the like. For example, if a cleaning worker fails to clean an object, exemplarily a desk, a supervisor or a custom may enter the not cleaned object in the location profile by writing a comment and/or taking a picture or video, which is then send as updating data to the first server together with preferably a identification of the further user, the location of the further user and a time stamp.

It may thereby be preferred that the user may prioritize the updating data, for example but not limited to three or more categories. For example, updating data of the first priority category may be the most important updating data and therefore provide to a first groups of users while the second and third category may be provided to restricted groups of users. Such groups of users may be defined by the user identification and/or mobile devices or other devices.

In particular it may be possible that updating data of a certain category directly results in informing a further user and assigning a task associated with said updating data to said user.

It may be possible according to one example of the present disclosure that at least one, in particular a plurality of, updating data is coupled to a certain date and time and a specific location profile, wherein it is possible to update the location profile.

For example, if an building like a fitness center opens at 7 a.m., it is possible to provide update data to the first server to update the location profile via the further mobile device that the floors are not cleaned until e.g. 9 a.m. After two hours people are walking through the fitness center it is not possible to identify it the floors have been initially been polluted or if they have been polluted again after cleaning.

It may as well be possible that the at least one mobile device comprises a device for detecting a machine-readable data tag. A machine-readable data tag according to the present disclosure is preferably a QR code, a radio-frequency identification (RFID)-tag and/or a near field communication (NFC)-tag. In the following, to ease the understanding of the present disclosure, it is only referred to a data tag without limiting the scope of the present disclosure.

Data related to the data tag may be comprised by the instructing data send to the at least one mobile device by at least the first server.

With the help of said data tag it may be possible to provide access to a building by sending e.g. tag data to a mobile device in combination with or separate from the instruction data. For example, a cleaning worker instructed to clean a certain building may receive access information directly on his mobile device which may according to one example of the present disclosure grant permanent or temporally excess to said building.

Moreover, according to one embodiment, at the server and/or at the mobile device a direction determination device is provided, wherein the direction determination device is providing instructing data in form directing the user to a certain location.

It may thereby be preferred that to provide the mobile device comprising a storage device for storing instructing data, user profiles and/or location profiles, wherein the storage device is selected from the group consisting of: an optical storage device, a magnetic storage device, a hard disk drive, a portable non-volatile memory device, a continuous powered volatile memory device, a memory card, a remote database, a local database, and a compact disc.

It may as well be possible according to the method according that the location determination unit further comprises a GPS receiver which receives GPS satellite signals and determines the current location of the user.

Finally, it may be preferred that the determining the current position of the user is accomplished using at least one direction determination methodology selected from the group consisting of: Global Positioning System, distance measurement equipment, time and frequency based changes in signals, radio frequency triangulation and intersection of radio signals with radials.

The foregoing aspects and many of the attendant advantages of this invention will become more readily appreciated as the same become better understood by reference to the following detailed description, when taken in conjunction with the accompanying drawing, wherein.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

While illustrative examples are illustrated and described below, it will be appreciated that various changes can be made therein without departing from the spirit and scope of the disclosure. In that regard, the detailed description set forth below, in connection with the appended drawings is intended only as a description of various examples of the disclosed subject matter and is not intended to represent the only examples. Each example described in this disclosure is provided merely as an example or illustration and should not be construed as preferred or advantageous over other examples. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

Figure 1:
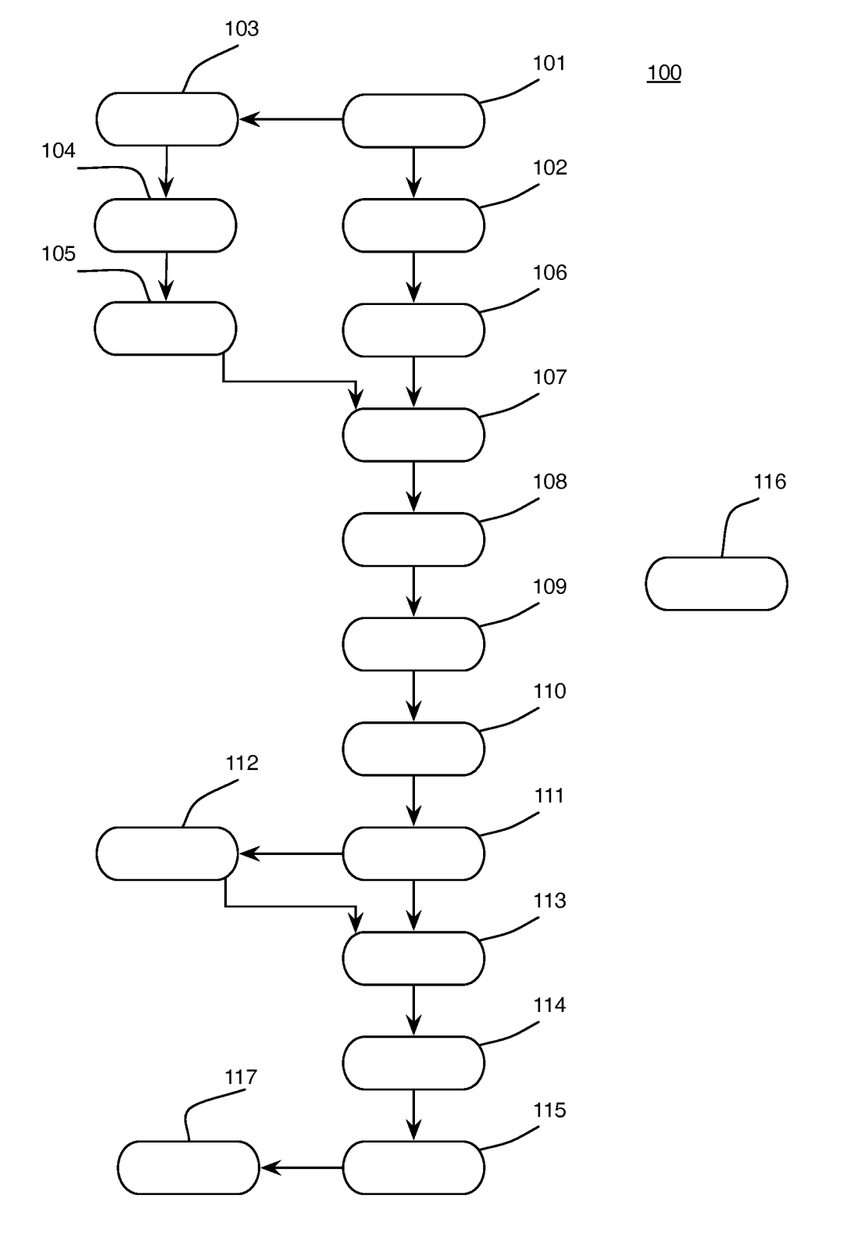
FIG. 1 is a schematic block diagram of an example of the method according to an embodiment.

FIG. 1 shows a diagram 100 illustrating an exemplarily example of the method according to the present disclosure.

For the method, at least one server operably connectable to at least one mobile device and at least one further device and at least one mobile device comprising a location determining unit for determining a current location of the mobile device is provided.

Moreover, at least one user profile and at least one location profile associated with a user of a mobile device, the location profile containing information relating to at least one geographic location, is provided.

In an optional step 101, a user may at the mobile device log into an application running on the first mobile device or directly log into an application that is hosted on the server, preferably with his username and password. According to one example of the present disclosure, the user may stay logged in or in the alternative may have to log again at certain points within the present method for establishing a connection.

In a step 102 at least one mobile device may send location data and/or first identification data of the at least one mobile device to a first server.

Therewith it is possible within a next method step 103 for a server to generate first instructing data based on the location data and/or the first identification data and the date and time and the location profile associate with the location data or another location profile.

For example it may be possible that in case the first mobile device provides the first identification data and the first location data to the server, the server identifies that several information and/or tasks may have to be performed by the user at a certain point of time. In the alternative, the server may identify that no specific task may have to be performed by the user at the current location of the user, but that according to a further location profile at said further location tasks may have to be performed. In this case, it may be for example possible to include into the instructing data to inform the user to move to said location. This may in particular be the case at the beginning of a working day, where the location profile of a user at home may no comprise any tasks, and the user is informed about the location to move to start working, or after all tasks at a certain location may have been completed.

In parallel to method step 102, the server may optionally determine in a method step 103 the total amount of time for completion of the tasks associated the location profile on a certain date and time, and requests in a subsequent or parallel method step 104 the available total time on a certain date and time from the at least one user profile from the at least one mobile device, and in particular further mobile devices at different and/or the same location as the first mobile device. In a method step 105, the first instructing data and in case further instructing data based on the said total amount of time for completion of the task and said available total time of the user profile(s) is generated by the server.

With the help of the method steps 103 to 105 it may be possible to determine the time of completion of all the task, the total available time of one or more users to perform the task and to assign specific task in respect to said information to certain users, and, in case assign task to users at other locations if the total time available of the user(s) is lower than the time needed for completion of the tasks.

In a method step 106, parallel or subsequent to the method step 102, it may be possible that at least one further mobile device may send location data and/or further identification data of the further mobile device to a first server.

According to an optional method step 107, the first instructing data and/or further instructing data may be generated based on the location of the at least one mobile device within a building, a location in outside a building, a ship, a car, a train and/or a plane, in or a further mobile device, in particular based on a certain room of said building.

In a method step 108, at the server, first instructing data may be send to the at least one mobile device, and in particular to the at least one further mobile device, and causing the at least one mobile device, and optional the at least further mobile device to display at least one representation related to said first instructing data.

According to an optional method step 109, said displaying of the first instructing data or the further instructing data may be combined with a representation of a current view of the user of the at least one mobile device and optional the user of the at least on further device as augmented reality, and in particular displaying the first instructing data, in particular party, next to, on the top of and/or at the objects.

In a next method step 110, at the at least one mobile device an input representative for an acceptance, partly acceptance or denial answer may be detected in response to the displayed representation of said first instructing data and sending the acceptance, partly acceptance or denial answer and the first identification data to the first server.

In an optional method step 111, at the server, it may be waited for the acceptance, partly acceptance or denial answer from the mobile device for a defined period of time, and in case of not receiving said answer sending a first reminder data to the mobile device and causing the at least one mobile device to display at least one representation of said first reminder data. In a subsequent optional method step 112 the server may wait for said answer for a further defined period of time, and in case of not receiving said answer after said further defined period of time sending a second reminder data to the mobile device and causing the at least one mobile device to display at least one representation of said second reminder data, and subsequently, or in the alternative, in a method step 113 the server may wait again for said answer for a further defined period of time, and in case of not receiving said answer after said further defined period of time updating the location profile an/or the user based on a denial answer, and in particular based on the updated location profile, at the sending second instructing data to a at least a second mobile device and/or to a further electronic device.

In a further method step 114, at the server, in response to the acceptance, partly acceptance or denial answer the location profile may be updated, and based on the location data, the first identification data, the date and time and the location profile associate with the location data generating at least second instructing data and sending said at least second instructing data to the at least one mobile device.

After updating the location profile, in a step 115, further instructing data may be send to the at least one mobile device and optional to the at least one further mobile device comprising a new location the user shall move to.

During performance of the method steps 101 to 115, in a step 116 a further user may update the location profile with updating data via a further mobile device, wherein said updating data may comprise a task, an information, a certain location, a due date and time, a time stamp and a further identification data of the further user and/or the further mobile device, in particular form of a text, a photo and/or a video, while said update of the location profile is recognized by the server to, in case, update the respective location profile.

This may allow a user to add further tasks or information to the location profile. Such an additional information or task may comprise a general task, a request for service, a general information, a damage report, hygiene report, a priority and/or the like. For example, if a cleaning worker fails to clean an object, exemplarily a desk, a supervisor or a custom may enter the not cleaned object in the location profile by writing a comment and/or taking a picture or video, which is then send as updating data to the first server together with preferably a identification of the further user, the location of the further user and a time stamp. It may thereby be preferred that the user may prioritize the updating data, for example but not limited to three or more categories. In particular it may be possible that updating data of a certain category directly results in informing a further user and assigning a task associated with said updating data to said user.

In an optional further method step 117, at a least one further mobile device an in input representative for the quality of completion of a task of at least the first user may be detected and data representative for said input may be send to the first server, wherein at the first server an analysis engine updates the score of the user profile of at least the first user.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The given examples of cleaning workers are provided to ease the understanding of the disclosure of the present application only. It is obvious for those skilled in the art that other tasks might be assigned as well to different users.

Nevertheless, according to one example of the present disclosure it may be preferred to use the method for assigning cleaning tasks to cleaning workers, in particular dynamically.

The features of the present invention disclosed in the description above and in the claims can be used for implementing the invention in its different embodiments both individually and in every possible combination thereof. The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A computer implemented method, for providing a mobile location based information service comprising the following steps, in the following sequence:
   a) providing at least one server operably connectable to at least one mobile device and at least one further device;
   b) at the server, providing at least one user profile the user profile comprises at least a total amount of time of the user available at a certain date and time and at least one location profile, the location profile containing information relating to at least one geographic location comprising tasks associated with a certain location and a point in time to carry out at least one of the tasks;
   c) providing at least one mobile device comprising a location determining unit for determining a current location of the mobile device;
   d) at the least one mobile device, sending current location data and/or first identification data of the at least one mobile device to the server;
   e) at the server, based on the location data and/or the first identification data and the date and time and a location profile associated with the location data and/or a location profile associated with a further location generating at least first instructing data, wherein the instructing data comprises at least one task, advise, instruction and/or information and preferably a due date and time, an expected time for completion and/or a start date and time;
   f) at the server, sending first instructing data to the at least one mobile device and causing the at least one mobile device to display at least one representation, to provide an audio output and/or a haptic output related to said first instructing data;
   g) at the at least one mobile device, detecting an input representative for an acceptance, in particular a partly acceptance, or a denial answer in response to the displayed representation, the provided audio output and/or the provided haptic output, of said first instructing data and sending the acceptance, in particular the partly acceptance, or the denial answer and the first identification data to the first server; and h) at the server, in response to the acceptance, in particular the partly acceptance or the denial answer updating the location profile, and preferably based on the location data, the first identification data, the date and time and the updated location profile associate with the location data generating at least second instructing data and sending said at least second instructing data to the at least one mobile device.

2. The method according to claim 1 further comprising the steps, after step g)

i) at the server, waiting for the acceptance, in particular the partly acceptance or the denial answer from the mobile device for a defined period of time, and in case of not receiving said answer sending a first reminder data to the mobile device and causing the at least one mobile device to display at least one representation, to provide an audio output and/or a haptic output of said first reminder data;

j) at the server, waiting for said answer for a further defined period of time, and in case of not receiving said answer after said further defined period of time sending a second reminder data to the mobile device and causing the at least one mobile device t to display at least one representation, to provide an audio output and/or a haptic output of said second reminder data; and/or k) at the server, waiting for said answer for a further defined period of time, and in case of not receiving said answer after said further defined period of time updating the location profile and/or the user based on a denial answer, and in particular based on the updated location profile, at the sending second instructing data to a at least a second mobile device and/or to a further electronic device.

3. The method according to claim 1, wherein the location profile comprises the time needed to complete a task and/or at least one floorplan of at least one building, in particular comprising the location of objects, in particular furniture, within the building, in particular a three dimensional and/or two-dimensional floorplan.

4. The method according to claim 1, wherein the user profile comprises at least a total amount of time of the user available at a certain date and time at a certain location, technical skills of a user, a score of the user and/or physical extends of the user and/or the location of a mobile device.

5. The method according to claim 1, wherein the instructing data comprises at least one task, advise, instruction and/or information and preferably a due date and time, an expected time for completion and/or a start date and time in form of a text, a graphical representation, a video and/or an audio representation.

6. The method according to claim 1, wherein at least two mobile devices sending first and second location data and first and at least second identification data for identifying the first and the at least the second mobile device to the first server, at the server, based on the first and second location data, the first identification data and at least the second identification data, the date and time and the location profile associate with the location data generating first and at least second instructing data and sending first instructing data to the first mobile device and causing the first device to display, to provide an audio output and/or a haptic output, at least one representation related to said first instructing data and sending at least the second instructing data to the at least one second mobile device and causing the at least one second mobile device to display, to provide an audio output and/or a haptic output, at least one representation related to said at least one second instructing data, and in response to the acceptance, in particular the partly acceptance or the denial answer from the first and the at least one second mobile device updating the location profile.

7. The method according to claim 1, further comprising the steps, in particular after or parallel to step e)

l) determining the total amount of time for completion of the tasks associated the location profile on a certain date and time;

m) requesting the available total time on a certain date and time from the at least one user profile from the at least one mobile device and in particular further mobile devices at different and/or the same location as the first mobile device; and n) generating the first instructing data and in case further instructing data based on the said total amount of time for completion of the task and said available total time of the user profile(s).

8. The method according to claim 1 further comprising the steps, in particular parallel to step e)

o) at the server, generating the first instructing data based on the location of the at least one mobile device within a building, a location in outside a building, a ship, a car, a train and/or a plane, in particular based on a certain room of said building, and in particular p) sending further instructing data to the at least one mobile device and causing the at least one mobile device to display, to provide an audio output and/or a haptic output, at least one representation related to said first instructing data, wherein the further instructing data comprises the location information for the user to move next.

9. The method according to claim 1 further comprising the steps, in particular parallel to step f)

q) at the at least one mobile device, displaying the first instructing data with a representation of a current view of the user of the at least one mobile device as augmented reality, and in particular r) displaying the first instructing data, in particular party, next to, on the top of and/or at the objects.

10. The method according to claim 1, further comprising the steps, in particular after or parallel to step e)

s) at the server, based on the location data, the first identification data, at least the information data of at least a further mobile device, the date and time and the location profile associate with the location data generating first instructing data and at least second instructing data; and t) sending first instructing data to the first mobile device and second instructing data to the at least one further mobile device and causing the first mobile device to display, to provide an audio output and/or a haptic output, at least one representation related to said first instructing data and causing the at least on further mobile device to display, to provide an audio output and/or a haptic output, at least one representation related to said second instructing data.

11. The method according to claim 1, wherein acceptance, partly acceptance or denial answers are received by the server, sending further instructing data to the at least one mobile device comprising a new location the user shall move to.

12. The method according to claim 1, wherein at a least one further mobile device, detecting an input representative for the quality of completion of a task of at least the first user and sending data representative for said input to the first server, wherein at the first server an analysis engine updates the score of the user profile of at least the first user.

13. The method according to claim 12, wherein informing the user in case of the score exceeds or falls below a predefined value, wherein in particular the analysis engine determining an overall score of all users receiving instructing data at a certain location profile and informing the said users if the overall score exceeds or falls below a predefined value, in particular informing each user about each single score of each of said users.

14. The method according to claim 12, wherein the analysis engine determines the score using the acceptance, in particular the partly acceptance or the denial answers of a user as a further parameter.

15. The method according to claim 1, wherein a further user may update the location profile with updating data via a further mobile device, wherein said updating data may comprise a task, an information, a certain location, a due date and time, a time stamp and a further identification data of the further user and/or the further mobile device, in particular form of a text, a photo and/or a video.

16. The method according to claim 1, wherein at the server and/or at the mobile device a direction determination device is provided, wherein the direction determination device is providing instructing data in form directing the user to a certain location.

17. The method according to claim 1, wherein providing the mobile device comprising a storage device for storing instructing data, user profiles and/or location profiles, wherein the storage device is selected from the group consisting of: an optical storage device, a magnetic storage device, a hard disk drive, a portable nonvolatile memory device, a continuous powered volatile memory device, a memory card, a remote database, a local database, and a compact disc.

18. The method according to claim 1, wherein the location determination unit further comprises a GPS receiver which receives GPS satellite signals and determines the current location of the user.

19. The method according to claim 1, wherein the determining the current position of the user is accomplished using at least one direction determination methodology selected from the group consisting of: Global Positioning System, distance measurement equipment, time and frequency based changes in signals, radio frequency triangulation and intersection of radio signals with radials.

* * * * *